US012719038B2

(12) United States Patent
Faur et al.

(10) Patent No.: US 12,719,038 B2
(45) Date of Patent: Aug. 25, 2026

(54) RF AMPLITUDE AUTO-CALIBRATION FOR MASS SPECTROMETRY

(71) Applicant: DH TECHNOLOGIES DEVELOPMENT PTE. LTD., Singapore (SG)

(72) Inventors: Manuel Faur, Concord (CA); Tiberiu Gera, Concord (CA); Andrei Tudor, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 344 days.

(21) Appl. No.: 18/569,898

(22) PCT Filed: Jun. 20, 2022

(86) PCT No.: PCT/IB2022/055723

§ 371 (c)(1),
(2) Date: Dec. 13, 2023

(87) PCT Pub. No.: WO2022/269471

PCT Pub. Date: Dec. 29, 2022

(65) Prior Publication Data

US 2024/0282562 A1 Aug. 22, 2024

Related U.S. Application Data

(60) Provisional application No. 63/213,522, filed on Jun. 22, 2021.

(51) Int. Cl.
*H01J 49/02* (2006.01)
*G01N 27/624* (2021.01)

(52) U.S. Cl.
CPC .......... *H01J 49/022* (2013.01); *G01N 27/624* (2013.01)

(58) Field of Classification Search
CPC .......... H01J 49/00; H01J 49/02; H01J 49/022; G01N 27/624

(Continued)

(56) References Cited

U.S. PATENT DOCUMENTS

2004/0220762 A1* 11/2004 Oeflein ................ G01R 35/005 702/107
2006/0016985 A1* 1/2006 Roushall ............. H01J 49/4215 250/282

(Continued)

FOREIGN PATENT DOCUMENTS

WO 2015/040382 3/2015

OTHER PUBLICATIONS

International Preliminary Report on Patentability corresponding to International Patent Application No. PCT/IB2022/055723, 9 pages, mailed Jan. 4, 2024.

(Continued)

*Primary Examiner* — Jason L McCormack
(74) *Attorney, Agent, or Firm* — Lathrop GPM LLP; Malaika O.D. Tyson; Jason Kuchar

(57) ABSTRACT

Systems and methods are disclosed for RF amplitude auto-calibration for mass spectrometry. As non-limiting examples, various aspects of this disclosure provide in a mass spectrometer comprising an RF gain block, a peak detector, and a controller: applying a DC voltage to the coil using the controller; measuring a DC calibration voltage using the peak detector; applying an RF voltage to the RF gain block using the controller; measuring an RF calibration voltage; calculating an RF calibration factor based on the measured calibration voltages using the controller; and during operation, and applying a combined RF and DC signal to the RF gain block based on the RF calibration factor. The DC voltage may be generated utilizing a first (Continued)

signal sent from the controller to the RF gain block via a DC amplifier.

21 Claims, 4 Drawing Sheets

(58) Field of Classification Search
USPC ................................ 250/281, 282, 286, 290
See application file for complete search history.

(56) References Cited

U.S. PATENT DOCUMENTS

| | | | | |
|---|---|---|---|---|
| 2006/0083146 | A1* | 4/2006 | Isshiki ................ | G11B 7/1381 369/44.41 |
| 2009/0140138 | A1 | 6/2009 | Vandermey | |

OTHER PUBLICATIONS

International Search Report and Written Opinion corresponding to International Patent Application No. PCT/IB2022/055723, mailed Sep. 21, 2022.

* cited by examiner

RF AMPLITUDE AUTO-CALIBRATION FOR MASS SPECTROMETRY

CROSS-REFERENCE TO RELATED APPLICATIONS/INCORPORATION BY REFERENCE

The present application is filed pursuant to 35 U.S.C. 371 as a U.S. National Phase application of International Patent Application No. PCT/IB2022/055723, which was filed Jun. 20, 2022, claiming priority to a U.S. provisional patent application filed on Jun. 22, 2021 titled "RF Amplitude Auto-Calibration for Mass Spectrometry," and having an Application No. 63/213,522, each of which is herein incorporated by reference in its entirety.

BACKGROUND

Conventional approaches for configuring mass spectrometers may be costly, cumbersome, and/or inefficient—e.g., they may be complex and/or difficult to implement. Further limitations and disadvantages of conventional and traditional approaches will become apparent to one of skill in the art, through comparison of such systems with some aspects of the present disclosure as set forth in the remainder of the present application with reference to the drawings.

SUMMARY

Figure 1:
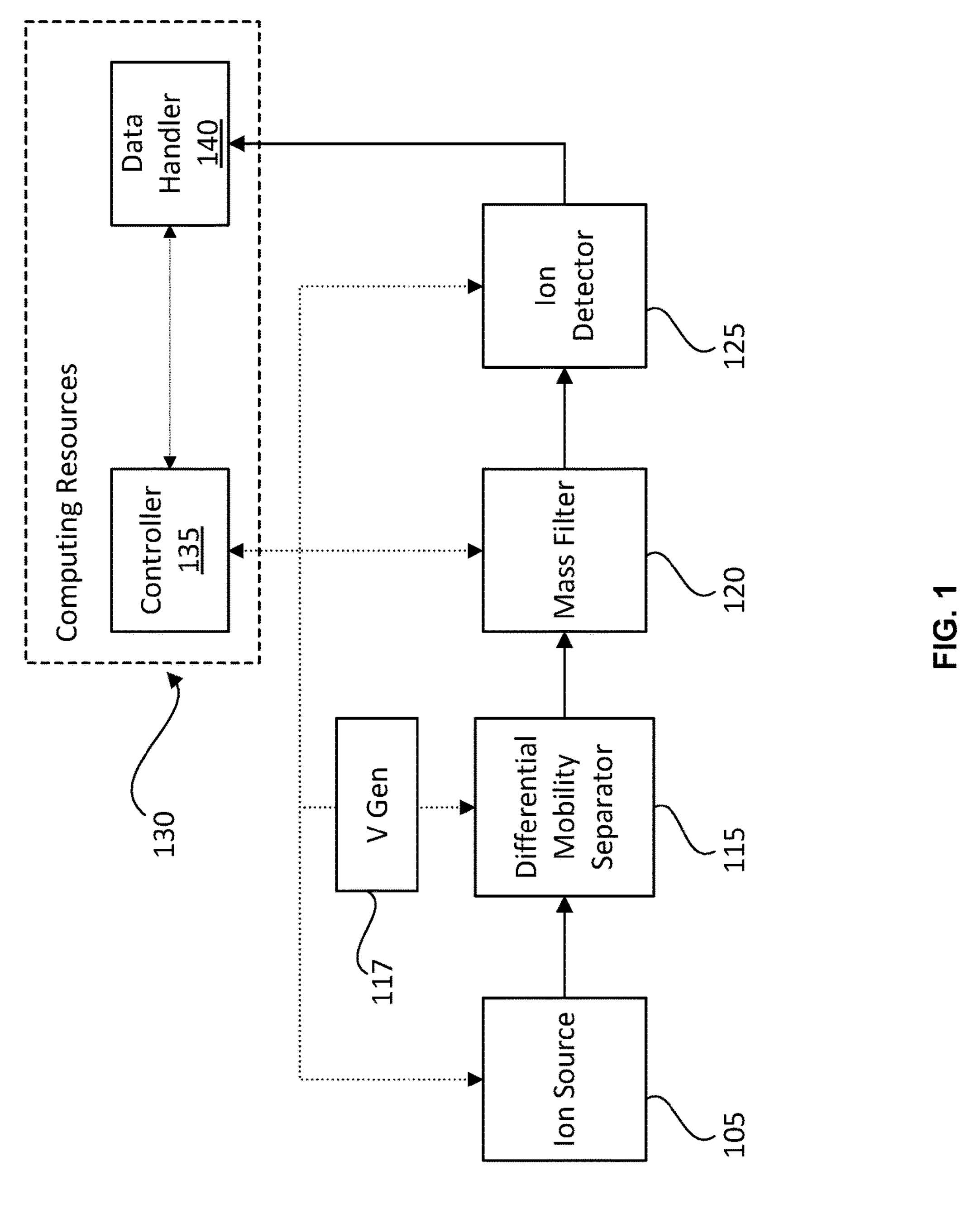
FIG. 1 shows a high level block diagram of a sample processing system according to an embodiment of the disclosure.

A system and/or method for RF amplitude auto-calibration for mass spectrometry, substantially as shown in and/or described in connection with at least one of the figures, as set forth completely in the claims.

In various embodiments, there is provided a method for mass spectrometry comprising a mass spectrometer having an RF gain block, a peak detector, and a controller and applying a DC voltage to the RF gain block using the controller; measuring a DC calibration voltage using the peak detector; applying an AC voltage to the RF gain block using the controller; measuring an AC calibration voltage; calculating an RF calibration factor based on the measured calibration voltages using the controller; and during operation, applying a combined RF and DC signal to the RF gain block based on the RF calibration factor.

In various embodiments, an RF component of the combined RF and DC signal comprises a sine wave. In various aspects, the method comprises generating the DC voltage utilizing a first signal sent from the controller to the coil via a DC amplifier. In various aspects, the method comprises converting the first signal from a digital signal from the controller to an analog signal to the DC amplifier using a first digital to analog converter. In various embodiments, the method comprises generating the RF voltage utilizing a second signal sent from the controller to the RF gain block via an RF amplifier. In various aspects, the method comprises converting the second signal from a digital signal from the controller to an analog signal to the RF amplifier using a second digital to analog converter. In various aspects, the analog DC and RF signals are combined using a summer before being applied to the RF gain block. In various embodiments, the method comprises detecting the calibration voltages using a capacitor and a voltage divider, the voltage divider with one terminal coupled to the RF gain block via a diode and a second terminal coupled to the controller. In various aspects, the method comprises converting a signal from the voltage divider to a digital signal before being communicated to the controller. In various embodiments, the method comprises generating the combined DC and RF signal by applying the RF calibration factor to a signal applied to the RF amplifier. In various aspects, the combined DC and RF signal generates an RF gain stage output voltage that has a 2% or better accuracy in the 0.1 to 10 kV amplitude range. In various aspects, the combined DC and RF signal generates an RF gain stage output voltage that has a 1% or better accuracy in the 0.1 to 10 KV amplitude range. In various embodiments, the RF gain block comprises a coil, transformer, or a resonant LC tank circuit.

In various embodiments, there is provided a system comprising a mass spectrometer having an RF gain block, a peak detector, and a controller. In various embodiments, the system is operable to apply a DC voltage to the RF gain block using the controller; measure a DC calibration voltage using the peak detector; apply an RF voltage to the RF gain block using the controller; measure an RF calibration voltage; calculate an RF calibration factor based on the measured calibration voltages using the controller; and during operation, apply a combined RF and DC RF signal to the RF gain block based on the RF calibration factor.

In various embodiments, an RF component of the combined RF and DC signal comprises a sine wave. In various embodiments, the system is operable to generate the DC voltage utilizing a first signal sent from the controller to the coil via a DC amplifier. In various aspects, the system is operable to convert the first signal from a digital signal from the controller to an analog signal to the DC amplifier using a first digital to analog converter. In various aspects, the system is operable to generate the RF voltage utilizing a second signal sent from the controller to the RF gain block via an RF amplifier. In various embodiments, the system is operable to convert the second signal from a digital signal from the controller to an analog signal to the RF amplifier using a second digital to analog converter. In various aspects, the analog DC and RF signals are combined using a summer before being applied to the RF gain block. In various aspects, the system is operable to detect the calibration voltages using a capacitor and a voltage divider, the voltage divider with one terminal coupled to the RF gain block via a diode and a second terminal coupled to the controller. In various embodiments, the system is operable to convert a signal from the voltage divider to a digital signal before being communicated to the controller. In various aspects, the system is operable to generate the combined DC and RF signal by applying the RF calibration factor to a signal applied to the RF amplifier. In various aspects, the combined DC and RF signal generates an RF gain stage output voltage that has a 2% or better accuracy in the 0.1 to 10 kV amplitude range. In various embodiments, the combined DC and RF signal generates an RF gain stage output voltage that has a 1% or better accuracy in the 0.1 to 10 kV amplitude range. In various embodiments, the RF gain block comprises a coil, transformer, or a resonant LC tank circuit.

In various embodiments, there is provided a method for mass spectrometry comprising a mass spectrometer having a coil, a peak detector, and a controller and applying a DC voltage to the RF gain block using the controller; measuring a DC calibration voltage using the peak detector; applying an RF voltage to the coil using the controller; measuring an RF calibration voltage; calculating an RF calibration factor based on the measured calibration voltages using the controller; and during operation, applying an RF signal to the coil based on the RF calibration factor and summing one or more additional DC voltages to the RF signal.

These and other advantages, aspects and novel features of the present disclosure, as well as details of an illustrated embodiment thereof, will be more fully understood from the following description and drawings.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

The current state of product development, and scientific advancement in general, for example in the life sciences, is hampered by current systems and methods, adding literally years to product and/or scientific development cycles.

FIG. 1 shows a high level block diagram of a sample processing system according to an embodiment of the disclosure. The sample processing system 100 comprises an ion source 105, a differential mobility spectrometer (DMS) 115, a mass filter 120, an ion detector 125, voltage generator 117, and computing resources 130.

The ion source 105 may comprise an electrospray source, for example, and may serve to transfer processed samples or sample aliquots to the DMS 115. The DMS 115 separates ions based on their mobility and may comprise a planar DMS, high field asymmetric waveform ion mobility spectrometry (FAIMS), curved electrode DMS, etc. In a planar example, the DMS 115 may comprise two flat, parallel plate electrodes where a separation voltage (SV) may be applied between them such that ions may be transported through the DMS 115 by a transport gas flow and drift towards one of the electrodes. AC and DC signals may be applied to cause ions with a specific ion mobility to pass through while others are deflected towards the electrodes.

The separation voltage may be supplied to the DMS 115 by voltage generator 117, and may comprise voltages in the kV range yet still needing an accuracy of 2% or better, or 1% or better for best operation of the DMS. Calibration of voltage generators may require costly equipment and components. To alleviate this issue, the voltage generator 117 comprises RF and DC voltage generation circuitry as well as a peak detector circuit for calibrating this voltage.

The DMS 115 may deliver selected ions to the mass filter 120, which may comprise one or more multipole rod sets, for example. The mass filter 120 may filter ions based on m/z, fragment, and/or mass analyze ions. An example of a mass filter 120 is one or more quadrupole rod sets. The mass filter 120 may comprise a plurality of quadrupole rod sets, for example three rod sets, that may be configured to filter specific ions.

The ion detector 125 may comprise an electron multiplier detector, an electrostatic trap, a time of flight (TOF) mass spectrometer, optical detector, or other known ion detector used in mass spectrometry. Example electron multipliers comprise microchannel plate (MCP) detectors, channel electron multipliers, discrete dynode electron multipliers, among others. The ion detector 125 may be operable to detect ions passed through by the mass filter 120. In an embodiment, the mass filter 120 comprises at least one multipole rod set and the ion detector 125 comprises an electron multiplier detector, an optical detector, an electrostatic trap or a TOF mass spectrometer.

The computing resources 130 may comprise a controller 135 and data handler 140. The controller 135 may control the ion source 105, the DMS 115, the mass filter 120, and the ion detector 125. The data handler 140 may store data for processing samples, sample data, or data for analyzing sample data, and may receive an output signal from the ion detector 125.

The computing resources 130 may include any suitable data computation and/or storage device or combination of such devices. An example controller may comprise one or more microprocessors working together with storage to accomplish a desired function. The controller 135 and/or data handler may include at least one computing element that comprises at least one high-speed data processor adequate to execute program components for executing user and/or system-generated requests.

In various embodiments, sample processing system 100 may be connected to one or more other computer systems across a network to form a networked system. The network may comprise a private network or a public network such as the Internet. In the networked system, one or more computer systems may store and serve the data to other computer systems. The one or more computer systems that store and serve the data may be referred to as servers or the cloud, in a cloud computing scenario. The one or more computer systems may include one or more web servers, for example. The other computer systems that send and receive data to and from the servers or the cloud may be referred to as client or cloud devices, for example. It will be apparent to those of skill in the relevant arts that various embodiments of the present disclosure may utilize a computer as is known in the art.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Figure 2:
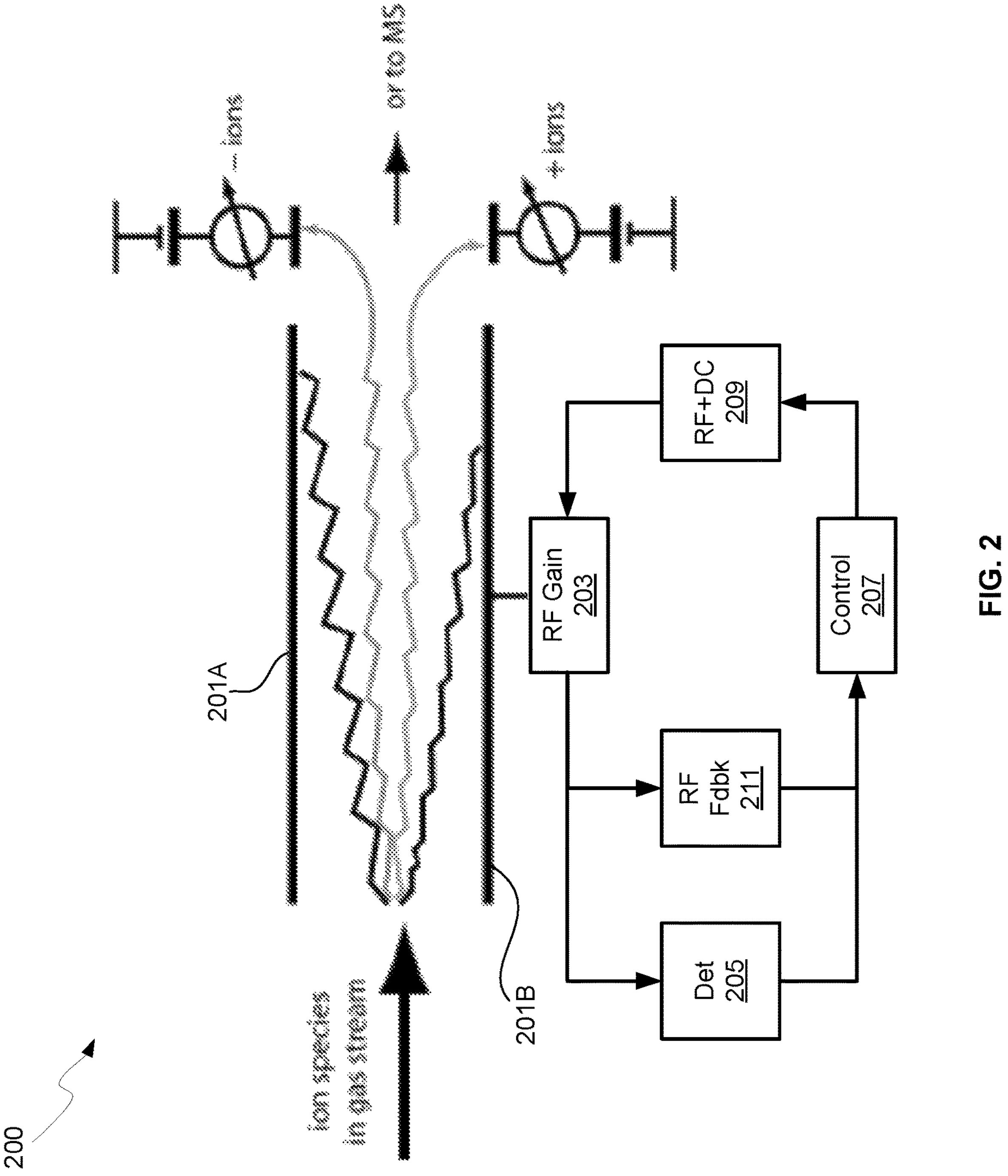
FIG. 2 provides a simplified schematic of an exemplar planar DMS system, in accordance with an example embodiment of the disclosure.

In an example scenario, computing resources 130 may be operable to control a mass spectrometer system, such as the system described with respect to FIGS. 1C-2. Accordingly, the computing resources 130 may be operable to control circuitry for configuring the method parameters in mass spectrometry operations. Optimizing method parameters in differential mobility spectrometry is not trivial in a high throughput mass spectrometer system. The SelexION® and SelexION+® planar DMS devices are examples of DMS systems that provide additional selectivity. Other DMS devices, including curved electrode FAIMS-style DMS devices may also be used for this purpose. In general, the disclosure herein contemplates use of any type of device that offers selectivity based on continuous filtering ion mobility and uses the term DMS to refer to these types of devices.

The difficulty in configuring SV is that it involves high accuracy at high speeds, which is typically not possible without calibration. This may be particularly true when trying to analyze a panel of compounds simultaneously. The incorporation of the voltage generation module 117 enables the generation of high-speed, high-accuracy RF signals.

FIG. 2 provides a simplified schematic of an exemplar planar DMS system, in accordance with an example embodiment of the disclosure. Referring to FIG. 2, there is shown DMS cell 200 comprising two flat, parallel plate electrodes 201A and 201B with an asymmetric separation voltage (SV) applied between them. In one example, the SV may be generated, for instance, by applying a first sine wave on one of the electrodes and a second sine wave with double the frequency and half the amplitude on the other electrode, and controlling the relative phase. Other non-limiting waveforms that can be used to create the SV are described in the following journal publication which is hereby incorporated by reference in its entirety (Krylov et al, "Selection and Generation of Waveforms for Differential Mobility Spectrometry", Rev. Sci Instr., 81, 024101, 2010).

FIG. 2 also shows an RF gain block 203, a peak detector 205, control circuitry 207, voltage generator 209, and RF feedback module 211. The RF gain block 203 may comprise a coil, a resonant gain element, a resonant LC tank circuit, or a transformer, for example, and may be operable to receive a RF+DC voltage comprising a separation voltage, a compensation voltage, and a DC voltage, and apply it to the parallel plate electrode 201B. The voltage may be generated by the voltage generator 209, which may be controlled by control circuitry 207. While FIG. 2 shows the calibration system in a DMS system, it is merely an example, where any mass spectrometer system or component that needs high accuracy high-voltage RF signals, such as quadrupoles, may utilize the voltage calibration system disclosed here.

The RF gain block 203 may be operable to apply the generated RF+DC voltage to one or both of the parallel plate electrodes 201A and 201B. In one example embodiment, the voltage generator 209 comprises RF and DC amplifiers coupled to a summer for providing an RF+DC voltage to the RF gain block 203.

Figure 3:
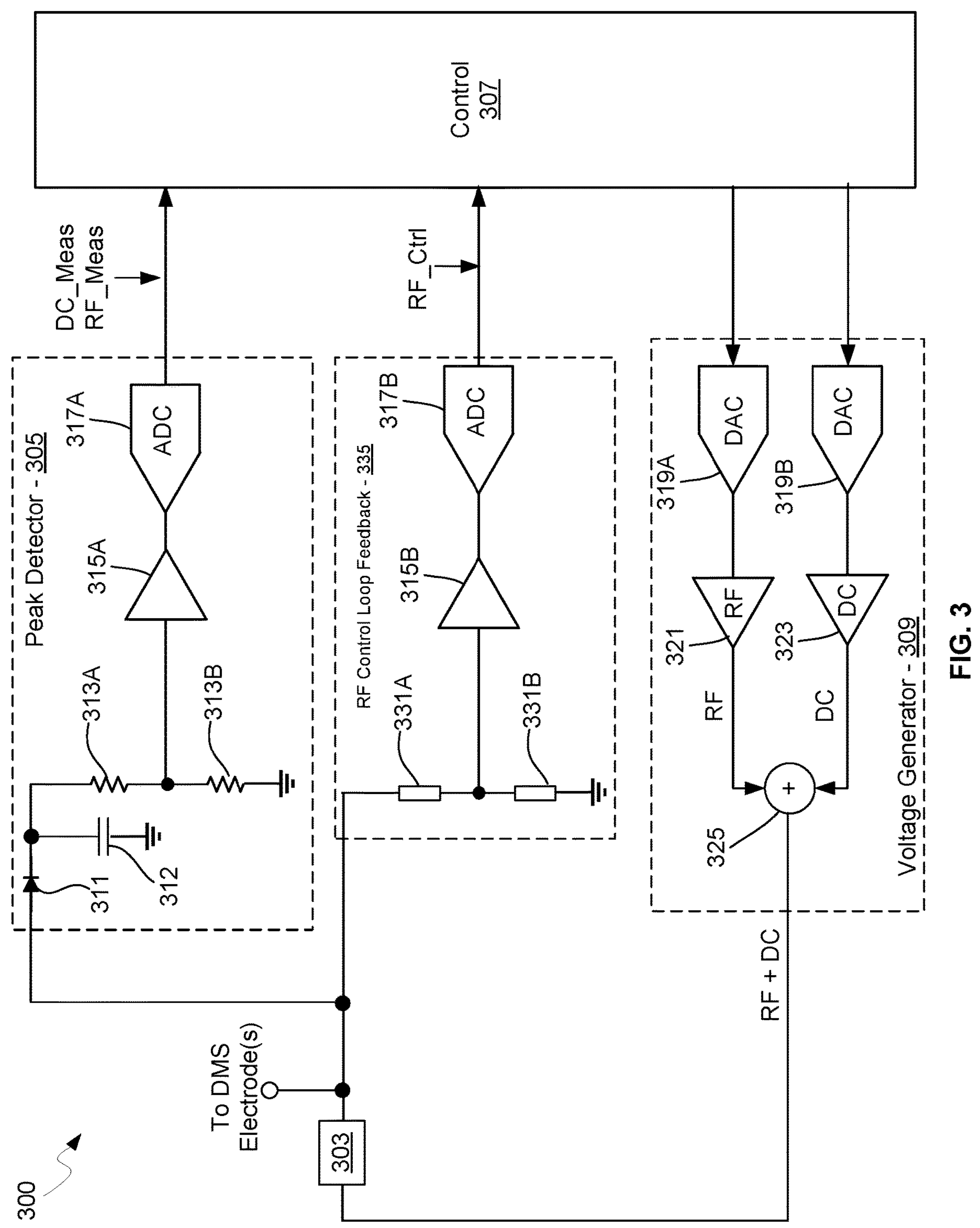
FIG. 3 is a schematic diagram of voltage calibration system for mass spectrometry, in accordance with an example embodiment of the disclosure.

The peak detector 205 may comprise an RF peak detection circuit comprising a diode, capacitor, resistive and/or capacitive voltage divider, analog amplifier, and analog-to-digital converter for monitoring the RF voltage on the RF gain block 203 during calibration and providing a digital signal representing the measured magnitude to control module 207, which in turn provides a control signal to the voltage generator 209, as described further with respect to FIG. 3.

The RF feedback module 211 may comprise a voltage divider, analog amplifier, and ADC for providing an RF feedback signal to the control module 207 for operational control of the DMS.

Ions may be transported through the DMS cell 200 by a transport gas flow and drift towards one of the electrodes 201A or 201B during the high field portion of the waveform and the other electrode during the lower field portion of the waveform. This results in a zig-zag trajectory with a net drift towards one or the other electrode 201A or 201B, depending upon the difference between an ion's high and low field mobility. A small DC potential (compensation voltage, CoV) may be applied between the two flat plates to correct the trajectory for a given ion such that the transport gas flow carries the ion into a downstream mass spectrometer (i.e. the DMS cell transmits the selected ion). As operational parameters, SV and CoV are often considered as a specific pair of values, i.e. an SV/CoV pair, for a given separation operation.

FIG. 3 is a schematic diagram of voltage calibration system for differential mobility spectrometry, in accordance with an example embodiment of the disclosure. Referring to FIG. 3, there is shown voltage generation and calibration circuit 300 comprising RF gain block 303, peak detector 305, control module 307, voltage generator 309, and RF control loop feedback 335.

The RF gain block 303 may be similar to the RF gain block 203 described with respect to FIG. 2, a coil, a resonant gain element, a resonant LC tank circuit, or a transformer, for example. The RF gain block 303 may be operable to apply an RF+DC signal to DMS electrodes, where the signal may comprise compensation voltage (DC), separation voltage (RF) and offset components (DC). The RF gain block 303 may also be coupled to the peak detector 305, which comprises a diode 311, a capacitor 312, resistors 313A and 313B, amplifier 315A, and analog-to-digital converter (ADC) 317. The resistors 313A and 313B may act as a voltage divider, the divided voltage being applied to the amplifier 315A for providing gain to the signal before being converted to digital by the ADC 317. The capacitor 312 and the diode 311 configure the measured signal to represent the peak of the RF voltage, as opposed to a scaled down version of it. The ADC 317 may be operable to provide a digital signal to the control module 307 that corresponds to the peak magnitude of the RF+DC voltage applied to the DMS electrodes by the RF gain block 303.

The RF gain block 303 may also be coupled to the RF control loop feedback 335, which may be operable to provide a feedback signal, RF_Ctrl, during operation. The RF control loop feedback 335 may comprise impedances 331A and 331B, which may comprise resistors, capacitors, or a combination of impedances for dividing the RF gain stage 303 output voltage, and may also comprise an amplifier 315B and ADC 317B. In operation, the RF control loop feedback 335 may measure the output voltage of the RF gain block 303 and provide a digital feedback signal RF_Ctrl to the control module 307.

The control module 307 may comprise a processor such as a field-programmable gate array, for example, although other types of controllers are possible. The control module 307 may be operable to configure the voltage generator 309 by applying control voltages/signals, and may utilize the signal from the peak detector 305 to calibrate offset and/or compensation voltages to be utilized during operation. The control module 307 may also be operable to utilize the RF_Ctrl signal from the RF control loop feedback 335 to control the voltage applied to the RF gain block 303 during operation. The control module 307 may generate signals that enable sinewave RF signals to be generated or as a summation of AC signals for a FAIMS waveform, for example. Other AC and DC waveforms are possible due to the digital signal generation of the control module 307 and the DACs 319A and 319B.

The voltage generator 309 may comprise digital-to-analog convertors (DACs) 319A and 319B, RF amplifier 321, DC amplifier 323, and summer 325. The DACs 319A and 319B may be operable to receive digital signals from the control module 307, and generate analog signals that correspond to desired AC and DC signal magnitudes. The RF amplifier 321 may be operable to receive an analog signal from the DAC 319A and generate a high current RF signal and the DC amplifier 323 may receive an analog signal from the DAC 319B and generate an output DC voltage. The dynamic range of the amplifiers 321 and 323 may be large enough so that voltages on the order of kV may be generated by the RF gain block 303. Similarly, the high precision and accuracy of the DC amplifier 323 ensures accurate separation voltage configuration.

The AC and DC voltages generated by the RF amplifier 321 and DC amplifier 323, respectively, may be summed by the summer 325 to generate an RF signal with a DC offset to be applied to the RF gain block 303. The peak detector 305 therefore provides a measurement path for calibration of the separation voltage, which enables a reproducible and accurate signal to the electrode by the RF gain block 303, while the RF control loop feedback RF provides accurate control of the voltage applied to the electrode by the RF gain block 303 during operation, based on the calibration factor determined during calibration.

Figure 4:
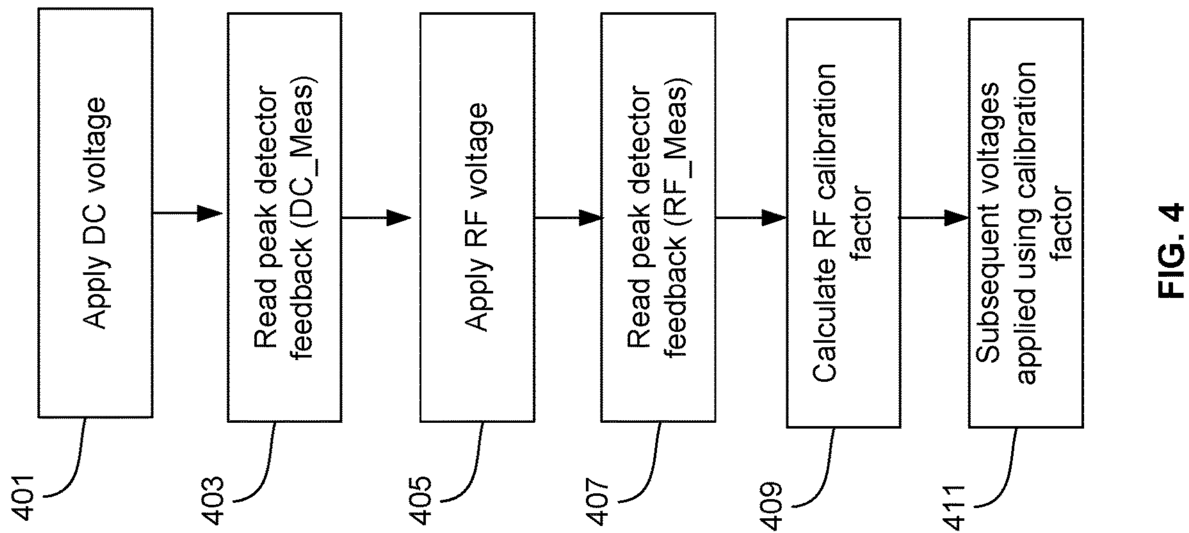
FIG. 4 illustrates a flow chart for differential mobility spectrometry separation voltage calibration, in accordance with an example embodiment of the disclosure.

FIG. 4 illustrates a flow chart for differential mobility spectrometry separation voltage calibration, in accordance with an example embodiment of the disclosure. Referring to FIG. 4, the process starts in step 401 where a DC voltage may be applied to the RF gain block 303 targeting 500V DC, for example, output at the RF gain block 303. In this scenario, the controller 307 may communicate a signal to the DAC 319B, the signal corresponding to a desired 500V output at the RF gain block 303. The DC amplifier 323 therefore generates an output voltage that is passed through the summer 325, summing with a null RF signal resulting in a DC signal applied to the RF gain block 303.

In step 403, the peak detector 305 may provide a measurement of the signal generated by the RF gain block 303 by providing a calibration measurement signal, DC_Meas, to the control module 307 via the voltage divider resistors 313A/313B, amplifier 315, and ADC 317.

In step 405, an RF signal may be applied to the RF gain block 303 with a desired output voltage of the RF gain block at 500V, for example. In this scenario, the controller 307 may communicate a signal to the DAC 319A, the signal corresponding to a desired 500V output at the RF gain block 303. The RF amplifier 321 therefore generates an output voltage that is passed through the summer 325, summing with a 0V DC signal, for example, resulting in an RF signal applied to the RF gain block 303.

In step 407, the peak detector 305 may provide a measurement of the signal output by the RF gain block 303 by providing a calibration measurement signal, RF_Meas, to the control module 307 via the voltage divider resistors 313A/313B, amplifier 315, and ADC 317.

In step 409, an RF calibration factor may be calculated. In one example, this factor may be defined as: RF_cal_factor=DC_fdbck/RF_fdbck and calculated by the control module 307, for example. In another example, the calibration factor may only take into account the RF calibration measurement. In yet another example, the calculation of the calibration factor may take into account the voltage drop across the diode 311. After the calibration factor has been calculated, the process may continue in step 411 where subsequent RF voltages applied to the RF gain block 303 may be configured using this calibration factor.

Because the calibration factor is calculated ratiometrically to the highly accurate DC amplifier output, errors in both the RF control loop feedback and the peak detector measurement circuit are reduced, yielding a great improvement in the accuracy of the RF voltage. In another example, a highly accurate peak detector circuit may be utilized to calibrate the RF directly without reference to the DC.

Depending on the application, more precision and accuracy may be provided. For example, DMS calibration requirements make a high precision divider useful, because no other RF calibration procedure can be applied to the DMS. Any increase in electrical RF calibration accuracy will translate into improved DMS performance. Therefore, it is useful to take into consideration the diode drop, so a high precision divider plus a reference DC is appropriate. For an RF quadrupole, since chemical calibration, which is much more precise, is performed at instrument level, there is no benefit from eliminating the diode drop in the calibration. The purpose of the electrical RF calibration in this case is to ensure that the feedback matches up well with range of the control loop feedback ADC, for the entire range of the RF. The DC is present in the circuit anyway, so using it does not increase the cost, therefore DC+"indifferent" precision divider is a cost-effective implementation. In an unlikely scenario where the DC is not present in the circuit, calibrating such a circuit would favor the "high precision divider only" solution, since adding a high precision reference DC signal would be very costly.

A system and/or method implemented in accordance with various aspects of the present disclosure, for example, provides RF amplitude auto-calibration for mass spectrometry. As non-limiting examples, various aspects of this disclosure provide in a mass spectrometer comprising an RF gain block, a peak detector, and a controller: applying a DC voltage to the RF gain block using the controller; measuring a DC calibration voltage using the peak detector; applying an RF voltage to the RF gain block using the controller; measuring an RF calibration voltage; calculating an RF calibration factor based on the measured calibration voltages using the controller; and during operation, applying a combined RF and DC signal to the RF gain block based on the RF calibration factor.

An RF component of the combined RF and DC signal may comprise a sine wave. The DC voltage may be generated utilizing a first signal sent from the controller to the coil via a DC amplifier. The first signal may be converted from a digital signal from the controller to an analog signal to the DC amplifier using a first digital to analog converter. The RF voltage may be generated utilizing a second signal sent from the controller to the RF gain block via an RF amplifier. The second signal may be converted from a digital signal from the controller to an analog signal to the RF amplifier using a second digital to analog converter.

The analog DC and RF signals may be combined using a summer before being applied to the RF gain block. calibration voltages may be detected using a capacitor and a voltage divider, the voltage divider with one terminal coupled to the RF gain block via a diode and a second terminal coupled to the controller. A signal from the voltage divider may be converted to a digital signal before being communicated to the controller. The combined DC and RF signal may be generated by applying the RF calibration factor to a signal applied to the RF amplifier. The combined DC and RF signal may generate a coil output voltage that has a 2% or better accuracy in the 0.1 to 10 kV amplitude range or a 1% or better accuracy at in the 0.1 to 10 kV amplitude range.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A method for mass spectrometry, the method comprising:

in a mass spectrometer comprising an RF gain block, a peak detector, and a controller:

applying a DC voltage to the RF gain block using the controller;

measuring a DC calibration voltage using the peak detector;

applying an AC voltage to the RF gain block using the controller;

measuring an AC calibration voltage;

calculating an RF calibration factor based on the measured calibration voltages using the controller; and during operation, applying a combined RF and DC signal to the RF gain block based on the RF calibration factor.

2. The method according to claim 1, wherein an RF component of the combined RF and DC signal comprises a sine wave.

3. The method according to according to claim 1, comprising generating the DC voltage utilizing a first signal sent from the controller to a coil via a DC amplifier.

4. The method according to claim 1, comprising generating the RF voltage utilizing a second signal sent from the controller to the RF gain block via an RF amplifier.

5. The method according to claim 1, wherein the DC and RF signals are combined using a summer before being applied to the RF gain block.

6. The method according to claim 1, comprising detecting the calibration voltages using a capacitor and a voltage divider, the voltage divider with one terminal coupled to the RF gain block via a diode and a second terminal coupled to the controller.

7. The method according to claim 1, comprising converting a signal from a voltage divider to a digital signal before being communicated to the controller.

8. The method according to claim 1, comprising generating the combined DC and RF signal by applying the RF calibration factor to a signal applied to a RF amplifier.

9. The method according to claim 1, wherein the combined DC and RF signal generates an RF gain stage output voltage that has a 2% or better accuracy in the 0.1 to 10 kV amplitude range.

10. The method according to claim 1, wherein the RF gain block comprises a coil, transformer, or a resonant LC tank circuit.

11. A system comprising:

a mass spectrometer comprising an RF gain block, a peak detector, and a controller, the system being operable to:

apply a DC voltage to the RF gain block using the controller;

measure a DC calibration voltage using the peak detector;

apply an RF voltage to the RF gain block using the controller;

measure an RF calibration voltage;

calculate an RF calibration factor based on the measured calibration voltages using the controller; and during operation, apply a combined RF and DC RF signal to the RF gain block based on the RF calibration factor.

12. The system according to claim 11, wherein an RF component of the combined RF and DC signal comprises a sine wave.

13. The system according to claim 11, wherein the system is operable to generate the DC voltage utilizing a first signal sent from the controller to a coil via a DC amplifier.

14. The system according to claim 11, wherein the system is operable to generate the RF voltage utilizing a second signal sent from the controller to the RF gain block via an RF amplifier.

15. The system according to claim 11, wherein the analog DC and RF signals are combined using a summer before being applied to the RF gain block.

16. The system according to claim 11, wherein the system is operable to detect the calibration voltages using a capacitor and a voltage divider, the voltage divider with one terminal coupled to the RF gain block via a diode and a second terminal coupled to the controller.

17. The system according to claim 11, wherein the system is operable to convert a signal from a voltage divider to a digital signal before being communicated to the controller.

18. The system according to claim 11, wherein the system is operable to generate the combined DC and RF signal by applying the RF calibration factor to a signal applied to a RF amplifier.

19. The system according to claim 11, wherein the combined DC and RF signal generates an RF gain stage output voltage that has a 2% or better accuracy in the 0.1 to 10 kV amplitude range.

20. The system according to claim 11, wherein the RF gain block comprises a coil, transformer, or a resonant LC tank circuit.

21. A method for mass spectrometry, the method comprising: in a mass spectrometer comprising a coil, a peak detector, and a controller:

applying a DC voltage to the RF gain block using the controller;

measuring a DC calibration voltage using the peak detector;

applying an RF voltage to the coil using the controller;

measuring an RF calibration voltage;

calculating an RF calibration factor based on the measured calibration voltages using the controller; and during operation, applying an RF signal to the coil based on the RF calibration factor and summing one or more additional DC voltages to the RF signal.

* * * * *